United States Patent [19]
Dennis et al.

[11] Patent Number: 5,498,081
[45] Date of Patent: Mar. 12, 1996

[54] BEARING ASSEMBLY INCORPORATING SHIELD RING PRECLUDING EROSION

[75] Inventors: Mahlon Dennis, Kingwood; Thomas M. Dennis, Houston, both of Tex.

[73] Assignee: Dennis Tool Company, Houston, Tex.

[21] Appl. No.: 168,949

[22] Filed: Dec. 17, 1993

[51] Int. Cl.$^6$ .......................... F16C 17/04; E21B 10/22
[52] U.S. Cl. .......................... 384/95; 384/420; 175/107
[58] Field of Search .................. 384/95, 907.1, 384/420, 303, 282, 284, 285, 243; 175/107

[56] References Cited

U.S. PATENT DOCUMENTS

| | | | |
|---|---|---|---|
| 4,345,798 | 8/1982 | Cortès | 384/907.1 X |
| 4,468,138 | 8/1984 | Nagel | 384/420 X |
| 4,560,014 | 12/1985 | Geczy | 384/285 X |
| 4,708,496 | 11/1987 | McPherson | 384/95 X |
| 4,802,539 | 2/1989 | Hall et al. | 384/95 X |
| 4,892,420 | 1/1990 | Kruger | 384/420 |

Primary Examiner—Thomas R. Hannon
Attorney, Agent, or Firm—Gunn & Associates

[57] ABSTRACT

A mud motor bearing assembly is defined by and constructed with a support or base ring having an exposed upper or planar face. On the planar face, a number of PCD disc are attached to define a bearing surface at a common plane. The improved bearing assembly further includes a separate ring or an integral lip serving as a deflector ring brazed to the face of the support ring. The brazed deflector ring alters the fluid flow patterns of drilling fluid in the bearing assembly to reduce support ring erosion.

20 Claims, 2 Drawing Sheets

BEARING ASSEMBLY INCORPORATING SHIELD RING PRECLUDING EROSION

BACKGROUND OF THE INVENTION

It is necessary to drill many oil and gas wells utilizing turbines and mud motors. Both turbines and mud motors are devices utilizing drilling fluid, normally known as drilling mud, as the flowing medium which rotates the drive components of the motor. Drilling fluid is normally formed of materials which, in water or oil base include solids that form an abrasive fluid. The abrasive fluid will destroy bearing assemblies. This is especially true of precision thrust or roller bearing assemblies. When they are enclosed in a sealed container, improved life can be obtained. By contrast, the present disclosure is directed to an exposed bearing assembly which does not wear rapidly in the presence of abrasive drilling fluid. The present disclosure sets forth a bearing assembling which is intentionally exposed to the abrasive drilling fluid in the immediate vicinity. More specifically, the bearing assembly is able to operate in the intended fashion notwithstanding the flow of abrasive drilling fluid in the immediate vicinity. One aspect of the flow of the drilling mud in the immediate vicinity of the bearing assembly is the risk of erosion. The fluid flow, especially with abrasive particles carried in it, tends to wear or grind away the exposed bearing assembly. The present disclosure sets forth a method and mechanism for protection of the bearing assembly.

It is not uncommon to form such a bearing assembly with an exposed circular disc of hardened materials which provides the surface for the rotating components. This exposed surface is made of natural or synthetic diamonds bonded to supporting carbide discs. There are several types of diamond wear pads known to the drilling industry. In one type, the diamonds have a large size and are positioned on the surface of a ring in a predetermined pattern. This can use a disc formed of a polycrystalline diamond supported on a sintered carbide support member.

In the following disclosed apparatus, it should be understood that the term polycrystalline diamond, PCD, or sintered diamond, as the material is often identified in the literature, can also be any of the superhard abrasive materials, including, but not limited to synthetic or natural diamond, cubic boron nitride, and wurtzite boron nitride as well as combinations thereof. In like manner, cemented metal carbide refers to a carbide of one of the group IVB, VB, or VIB metals which is pressed and sintered in the presence of a binder of cobalt, nickel, or iron and the alloys thereof.

Diamonds are an allotropic form of carbon, which is crystallized isometrically. It consists of carbon atoms covalently bound by single bonds only in a predominantly octahedral structure. This accounts for its extreme hardness (Mohs 10) and great stability. It has a specific gravity of 1.5 and a coefficient of friction of 0.05. Diamonds melt at 3700° C. They can also be made synthetically by heating carbon and a metal catalyst in an electric furnace at about 3000° F. under pressure of about 1.3 million psi.

Carbide for the ring is a binary solid compound of carbon and another element. The most familiar carbides are those of tantalum, titanium, tungsten, silicon, boron, and iron (cementite). Two factors have an impact on the properties of carbides and they are: (1) the difference in electronegativity between carbon and the second element, and (2) whether or not the second element is a transition metal. A "cemented carbide" is formed from a powdered form of refractory carbide which is united by compression with a bonding material (usually iron, nickel, or cobalt) followed by sintering. For example, tungsten carbide is bonded with 3 to 25 percent cobalt at 1400° C. Cemented carbide is used chiefly in metal cutting tools which are hard enough to permit cutting speeds in rock or metal up to 100 times that obtained with alloy steel tools.

Boron nitride (BN) occurs as a white powder, with a particle size of about 1 micron, having a graphite-like hexagonal plate structure which melts at 3000° C. When compressed at about one million psi, it becomes about one half as hard as diamond. The resulting material has excellent heat and shock resistance.

This bearing assembly is related to composite or adherent multimaterial bodies of diamond, cubic boron nitride (CBN) or wurtzite boron nitride (WBN) or mixtures thereof for use as an abrasion resistant bearing pad particularly used in a mud motor.

Composite polycrystalline diamond compacts, PCD, have been used for industrial applications including rock drilling and metal machining for many years. One of the factors limiting the success of PCD is the strength of the bond between the polycrystalline diamond layer and the sintered metal carbide substrate. This, however, results in a cutting tool with a relatively low impact resistance. Due to the differences in the thermal expansion of diamond in the PCD layer and the binder metal used to cement the metal carbide substrate, there can be a shear stress in excess of 200,000 psi at the interface between these two layers. The structured bond opposed to this stress must be located in an extremely thin layer of cobalt which is the common or preferred binding medium that holds the PCD layer attached to the metal carbide substrate. Because of the very high stress between the two layers which normally have a flat and relatively narrow transition zone, it is relatively easy for the bearing to delaminate in this area upon impact. Additionally, it has been known that delamination can also occur on heating or other disturbances in addition to impact. In fact, parts have delaminated without any known provocation, most probably as a result of a defect within the interface or body of the PCD which initiates a crack and later results in catastrophic failure.

The PCD is normally positioned on the beating ring or assembly in the form of a steel disc. It is constructed and arranged so that it supports substantial weight. For cooling, the mud (typically water and abrasive constituents) flows over this area with such volumetric flow that erosion normally occurs in the area of the support ring between the circular disc of PCD. This erosive impact from flow destroys the bearing assembly prematurely. It cuts through the bearing assembly, removing steel which is required for the body of the bearing assembly and thereby cutting the support for the PCD disc. One aspect of this invention is the use of a tungsten carbide ring to prevent erosion.

Another aspect of the present invention is the incorporation of a curve shoulder or protruding lip adjacent to the PCD disc. This is incorporated for the express purpose of alternating the flow pattern of the drilling fluid. Because the drilling fluid does not directly impinge on the face of the bearing ring, erosion is reduced, perhaps even avoided, and the surrounding shoulder helps shelter the PCD disc which prevents rapid wear of the entire bearing assembly. An important aspect of the present disclosure is therefore incorporation of a surrounding peripheral ring construction with a protruding lip or shoulder which thereby deflects the flow of drilling fluid away from the PCD disc and which reduces erosion. This lengthens the life of the equipment substantially.

One aspect of the present disclosure is the construction of a ring shaped bearing assembly incorporating a surrounding shoulder mounted on the exposed face of the ring assembly wherein the shoulder deflects fluid flow to thereby preserve the bearing assembly during use. The erosive impact of fluid flow is markedly changed. The erosive effect of the drilling mud is substantially reduced to thereby avoid weakening of the ring shaped bearing assembly between adjacent PCD discs The structure of this disclosure thus incorporates a round bearing assembly formed of a hardened carbide noted above, the preferred being a matrix supporting tungsten carbide ring, and an attached or integral adjacent ring on the exposed face. The ring defines a shoulder which extends sufficiently high above the face of the ring so that the PCD discs mounted on the ring are protected from erosion.

For purposes of use in a turbine or mud motor, the product of the present disclosure is a ring shaped bearing assembly wherein the ring has a cement carbide body, rectangular in cross-section, having a brazed set of PCD discs thereon. In addition to the brazed discs, an adjacent ring defining an upstanding shoulder may be incorporated to protect against the erosive impact of use. Moreover the attached ring defining the upstanding shoulder is integral or brazed on the base ring. This fabrication step can be carried out in conjunction with the necessary fabrication steps required to attach the several discs to the ring.

BRIEF SUMMARY OF THE DISCLOSED APPARATUS

Briefly, the present disclosure sets forth both a method of fabrication and the finished product which are directed to making a bearing assembly for use in a mud motor where the bearing assembly is exposed to the corrosive and erosive drilling fluid. The finished product utilizes a cemented carbide base ring, circular discs at even spacing about the ring, an enhancement of a protruding ring defining an upstanding shoulder. The shoulder protects the attached PCD discs on the ring. This is particularly useful in a bearing assembly intended for use in drilling fluids.

BRIEF DESCRIPTION OF THE DRAWINGS

So that the manner in which the above recited features, advantages and objects of the present invention are attained and can be understood in detail, more particular description of the invention, briefly summarized above, may be had by reference to me embodiments thereof which are illustrated in the appended drawings.

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
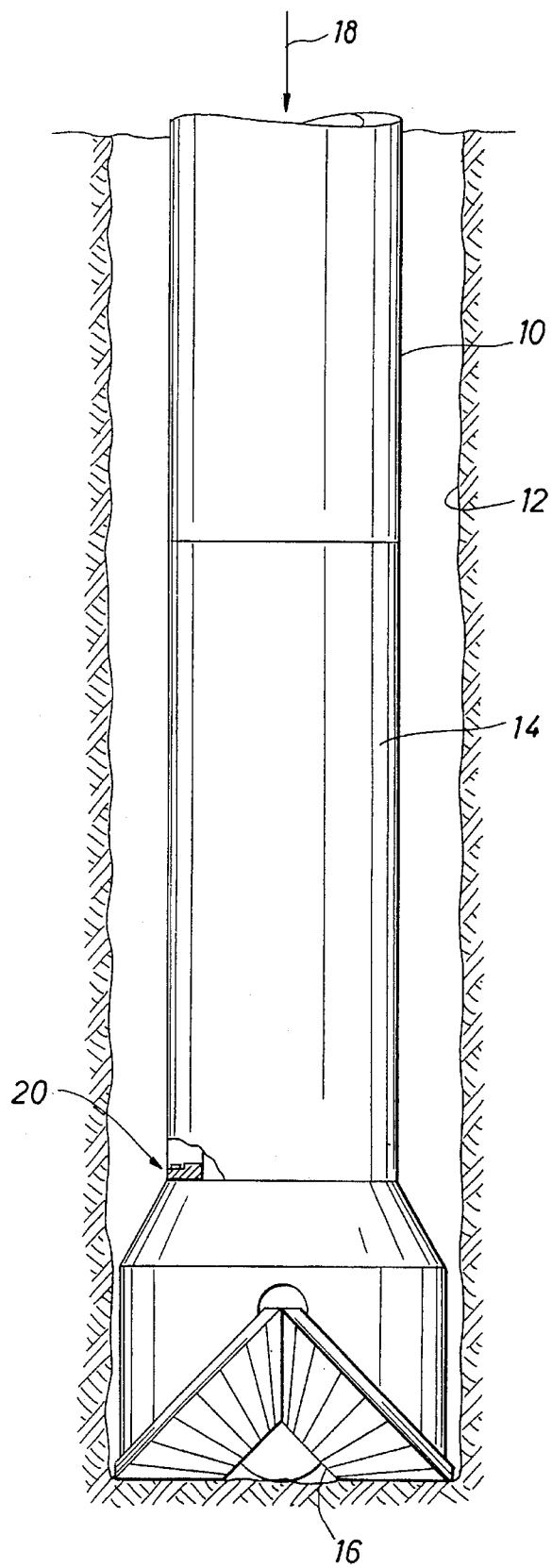
FIG. 1 shows a mud motor arranged in a well borehole with a portion of the wall broken away to show a bearing assembly which is in the mud motor and which is exposed to drilling fluid which might otherwise destroy the bearing assembly.

Attention is now directed to FIG. 1 of the drawings which shows a drilling string having a drill collar 10 in a well borehole 12 which provides mud flow to a mud motor 14. The mud motor 14 rotates a drill bit 16 which advances the well borehole 12. There is an axial flow path through the drill collar 10 which is indicated by the arrow 18 which is indicative of mud flow. Moreover, the mud motor 14 is required to rotate submerged in the drilling mud. The mud motor is constructed with a bearing assembly 20 which is incorporated for the express purpose of supporting the thrust or axial load of the drill string which is supported on the drill bit. Therefore, the bearing assembly 20 is required to carry a substantial thrust load. This simplified representation shows how the mud motor is driven by the fluid flow of the mud in the drill string which causes the drill bit to rotate through operation of the mud motor 14.

Figure 2:
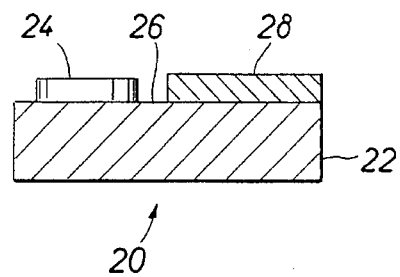
FIG. 2 is a sectional view through a bearing assembly of the sort used in FIG. 1 of the drawings and further showing an arrangement of a surrounding ring defining an upstanding shoulder which protects the inserts on the ring from erosion.
Figure 3:
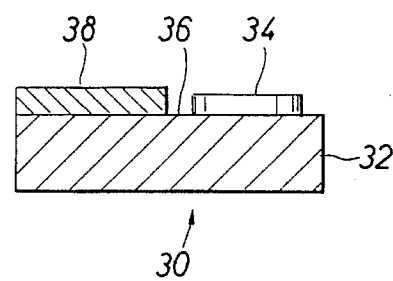
FIG. 3 is a sectional view through the bearing assembly of the present disclosure showing a base ring and a protective shoulder adjacent to it.
Figure 4:
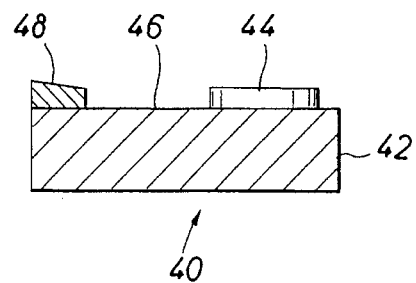
FIG. 4 is a sectional view similar to FIG. 2 showing an alternate embodiment where the protective shoulder is arranged on the exterior of the inserts.

For further consideration of the bearing assembly 20, attention is now directed to FIGS. 2, 3 and 4 of the drawings. The embodiment 20 shown in FIG. 2 incorporates a base ring member 22. This ring shaped member is constructed of a matrix of support metal in conjunction with tungsten carbide particles. Moreover, this ring supports the basic bearing assembly in registration with support shoulders which align the ring at the required location in the bearing 20 assembly and mud motor 14. Furthermore, it includes a set of circular PCD discs 24 which are joined to the top face 26. The discs 24 are brazed to the ring. The discs are constructed of PCD material to provide a smooth surface with a minimum of friction. It supports the load of the rotating components thereabove which bear against the discs 24. Several such discs are supported on the ring 22. The many discs are usually somewhat circular, provided with a common diameter and extend to a common height so that the several discs define a common support plane. This enables the thrust load bearing on the assembly 20 to be supported with rotational movement.

As further shown in FIG. 2 of the drawings, a surrounding ring 28 is brazed to the larger ring 22. It should be recalled that the sectional cut line defining FIG. 2 is through the support ring 22. The ring 22 may have a width of an inch or so, and also has a major diameter of perhaps seven or eight inches depending on the size of the mud motor housing. There is a central opening in the ring 22 thereby defining an inside face at the right side of FIG. 2 and an outside face the left hand side of FIG. 2. The ring 28 has a common or matching diameter at the central hole through the ring 22. It does not however have width which is equal to the ring. Preferably, the ring 28 stands as tall or taller as the PCD insert which is brazed to the top face of the ring 22. The ring 28 stands taller if there is no interference with the overhead load bearing on the discs 24. If the overhead load is likely to interfere with the ring 28, then it is better to make the ring 28 shorter than the discs 24 so that the only region of load contact is the top face of the discs 24. The face 26 thus supports the several PCD discs on the outer marginal edge adjacent to the ring 28 which occupies the marginal inner portion of the face 26. Moreover, the adhesively joined ring 28, held in position after brazing, serves as a deflection barrier for drilling fluid so that drilling fluid does not scour the top face 26 and thereby erode a regional portion between two of the disc 24.

Going now to FIG. 3 of the drawings, an alternate embodiment is shown which is similar to the embodiment in FIG. 2 of the drawings. Again, there is a base or bottom support ring 32 which is similar in other regards to the ring 22 shown in FIG. 2 of the drawings. Again, it is provided with an upper face 36 which supports a set of PCD discs 34 which are brazed to the upper face. They are attached at the inner marginal area. The ring 38 is brazed on the outer marginal area of the support or base ring 32. Comparing the two embodiments 20 and 30, the rings comprising the base of the bearing assembly are preferably identical and the PCD discs are preferably identical. The PCD discs are brazed to the surface of the ring near the outer peripheral edge while the inner peripheral edge supports the discs in the embodiment 30. In both instances, the upstanding rings 28 and 38 serve as deflection shields or barriers which prevent the damaging erosion of the main support ring 22 or 32 by drilling mud flow between the discs. The protective rings 28 or 38 extend the life of the support bearing assembly.

In FIG. 4 of the drawings, the numeral 48 identifies another ring which is attached to the embodiment 40. As before, the support ring 42 is similar in all regards to the rings 22 and 32. The several PCD discs 44 on the top face 46 are attached on the inner marginal area. The deflector ring 48 is attached at the outer edge of that marginal area. Here, the deflector ring 48 has a different profile. That is, it is constructed as illustrated so that a transverse section through the deflector ring shows a sloping upper face. This helps control fluid flow across the ring 42. This helps by providing sufficient height so that flow patterns are altered in the mud motor.

All three embodiments 20, 30 and 40 function in similar fashion, namely they function to deflect drilling fluid flow and thereby protect the face of the support rings 22, 32 and 42. In all instances, the rings 28, 38 and 48 extend to a height equal to or greater than the PCD discs which are attached on the support rings. In all instances, the PCD discs are provided with clearance or space from the deflector rings so that the several discs collectively shoulder against the overhead thrust load from in the drill stem. In all instances, the PCD discs are constructed with the design diameter and quantity to provide the bearing function which the assembly is intended to serve. The enhancement achieved in the present disclosure is obtained primarily through the attachment of the brazed deflector ring. That ring, when installed as illustrated, changes the mud flow patterns substantially. Also the rings 28, 38 and 48 can be shorter than the discs if there is no clearance for the overhead thrust load.

Figure 5:
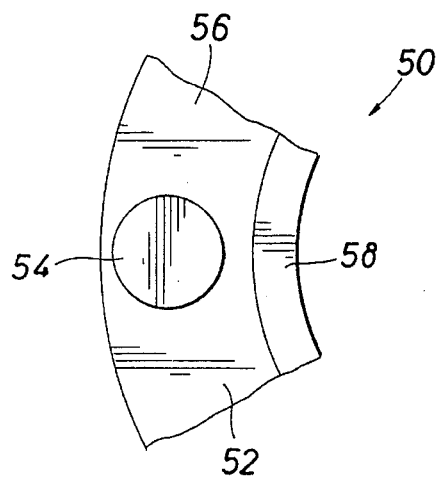
FIG. 5 is a plan view of a portion of a bearing assembly showing an insert on the outer part of the ring and the inner ring part of the ring supports an upstanding shoulder.
Figure 6:
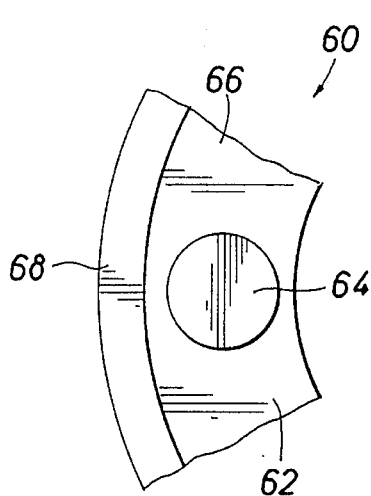
FIG. 6 is a view showing the ring on the outer periphery adjacent the inserts on the inside of the ring.

Attention now directed to FIGS. 5 and 6 which are plan views of bearing assemblies 50 and 60. The bearing assembly 50 shows a base or support ring 52 which has PCD discs 54 brazed on the top outer marginal area at the top face 56. The upstanding ring 58 is located at the inner marginal edge. By contrast the embodiment 60 positions the ring on the outer marginal edge. The embodiment 60 discloses a support ring 62 which supports a PCD discs 64 brazed on the top face or surface. The surface or face 66 of the support ring 62 is constructed to support several such discs around the bearing assembly. The outer marginal edge anchors the upstanding ring 68 which serves as the mud flow deflector. The embodiments 50 and 60 differ in that the mud flow deflector ring is on the interior of the structure as shown at FIG. 5 and on the outer edge as shown in FIG. 6.

Figure 7:
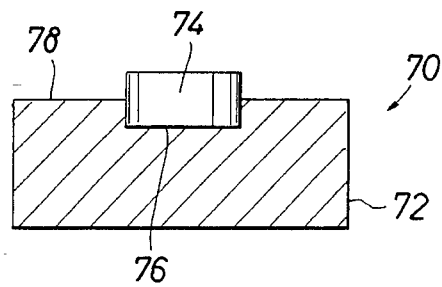
FIG. 7 is a sectional view through a bearing assembly showing an upstanding PCD discs and further incorporating an outer peripheral upstanding shoulder to deflect drilling fluid flow to prevent erosion.
Figure 8:
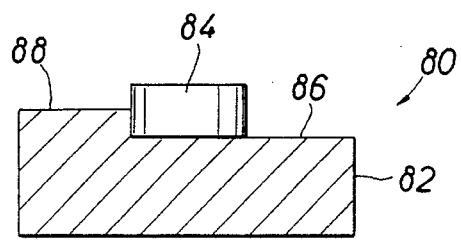
FIG. 8 is a view similar to FIG. 7 showing an alternate embodiment with an outer raised deflector portion of the ring adjacent to a set of PCD discs supported on the bearing assembly.

In several views including the embodiments 20, 30, 40, 50 and 60, it is preferable that the support ring be constructed as a singular unit of unitary construction. In addition to that the several PCD discs are attached next to the deflector ring attached on the top face by brazing. The two rings are therefore separately fabricated structures. The two rings are constructed so that the two rings are able to be joined at a region of facial contact by brazing using ordinary construction techniques. This provides the necessary deflector assembly for the protection just mentioned. Attention is now directed to FIG. 7 of the drawings where the numeral 70 identifies an alternate embodiment. In this embodiment, the support ring 72 is constructed in the same fashion as the support rings 22, 32 and 42 discussed earlier. In this particular case, it is constructed to support several preferably similar PCD discs 74 which are brazed or otherwise bonded to the top face of the ring shaped support member 72. As before, the ring shaped support member is provided with a major diameter which enables the support ring to be fitted in the housing of a mud motor. A thrust bearing support surface is defined by the several PCD discs which are supported on the ring. In this particular embodiment, the ring is provided with a support face 76. The face 76 is in the form of a circular face which extends fully around the ring. There is an external raised portion i.e., the ring 72 is made thicker at the outer portion 78. This thicker portion 78 extends taller than the support surface 76 of the ring. This provides a two step construction. The outer area stands taller and thus is the taller step portion while the central portion 76 of the ring is lower, noting the support surface or face 76. The surface 76 is provided with a width which is equal to or greater than the diameter of the PCD discs 74. One or more discs are supported on that surface 76, the several discs being brazed to the surface. This defines a recess where the many discs can be readily anchored. By contrast, the embodiment 80 which is shown in FIG. 8 of the drawings incorporates a support ring 82 of similar construction which is provided with several PCD discs 84 supported on the top exposed face or surface 86. The face or surface 86 defines a step area which does not stand as tall as the top most or taller surface 88. The difference in height defines the two steps. Again, the several PCD discs are attached by brazing to the surface 86. The surface 86 supports the plurality of PCD discs so that a bearing surface again is defined.

The embodiments 70 and 80 are very similar in construction. They are similar in that they can support the same number of similar PCD discs brazed to the top lower step area. The taller step area identified at 78 and also 88 are taller and provide a deflector for mud flow. The difference in the two embodiments relates primarily to the fact that the embodiment 70 has an inner height which extends to the same step as the outer step 78. The embodiment 80 does not include this inner step of greater height.

Figure 9:
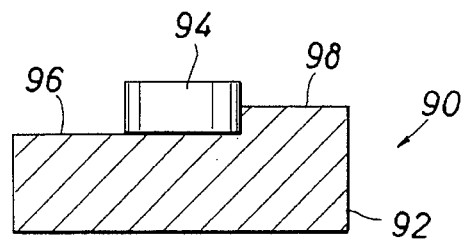
FIG. 9 is a view similar to FIGS. 7 and 8 in which the raised deflector portion is arranged on the inner peripheral area.

In FIG. 9 of the drawings, the embodiment 90 again utilizes a support ring 92 provided with a set of PCD discs 94 which are supported on a first or shorter step face 96. This is the support area for the several discs and also extends radially outwardly. There is however an inner raised region of greater thickness which defines a step or face at 98 which extends taller than the step or face 96. The embodiments 80 and 90 are similar in construction except that the taller ring is on the exterior in FIG. 8 of the drawings and is located on the interior at FIG. 9 of the drawings. In all instances, the support rings 72, 82 and 92 are of unitary construction, being preferably molded to this shape, and having machined upper faces for registration of the supporting discs.

Figure 10:
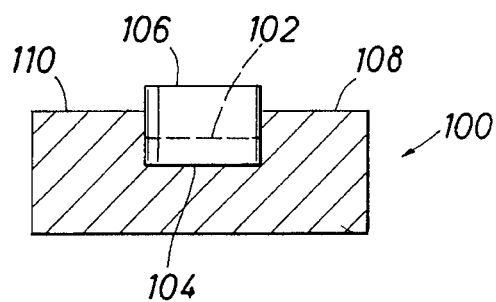
FIG. 10 is a sectional view through a bearing assembly further showing a circular PCD bearing disc which is recessed into a drilled hole formed in the bearing assembly support ring.

In the embodiment 100 which is shown in FIG. 10 of the drawings, there is a central recess or face 102 which forms a circle and is central on the face of the ring shaped bearing assembly. At spaced locations it is drilled to a greater depth, the bottom of the drilled hole being noted at the inner face 104. A PCD discs 106 of greater height is inserted in the drilled hole. The drilled hole having the bottom face 104 is sized so that the discs can be fitted into the drilled hole to lock the discs against lateral movement. The PCD discs is bonded by brazing. It will not move.

The surface 102 is a circle extending fully about the bearing assembly. There is an inner step 108 and a similar but outer step 110 which are preferably extended to a common height and the two are located so that they bracket the several PCD discs. They serve as a deflector so that drilling fluid does not come into contact with the face 102 with sufficient flow to cause erosion.

Summarizing the several embodiments 70, 80, 90 and 100, they all show a unitary body. The body is made with the respective differences in thickness by forming or casting the body in the illustrated fashion. The singular body construction enables one to anchor the several discs at a common height adjacent to the stepped or taller portion which provides a deflector of the drilling mud flow. In summary, the embodiments 70, 80, 90 and 100 utilize a unitary body supporting a similar set of PCD discs. Different from the embodiments 20, 30 and 40, the PCD discs in this construction stand taller than the deflector ring immediately adjacent the discs.

While the foregoing is directed to alternate preferred embodiments, the scope of the present disclosure is set forth in the claims which follow.

What is claimed is:

1. A mud motor bearing assembly comprising:
   (a) a circular support ring of cemented carbide having an exposed upper face;
   (b) a plurality of similar PCD surfaces brazed to the face of said ring wherein said exposed PCD surfaces define a bearing support plane; and
   (c) a deflector ring above said support ring to deflect drilling fluid flow so that erosion damage to said bearing support plane is reduced.

2. The apparatus of claim 1 wherein said deflector ring is a ring affixed to the outer marginal facial area of said support ring upper face.

3. The apparatus of claim 2 wherein said deflector ring is a ring affixed to the inner marginal facial area of said support ring upper face.

4. The apparatus of claim 1 wherein said deflector ring comprises a circular ring having a lower face brazed to said support ring at the upper face thereof.

5. The apparatus of claim 1 wherein said support ring has an exposed upper face arranged at right angles to an axis of rotation for said bearing assembly and further wherein said deflector ring is of uniform cross-sectional shape about said axis of rotation.

6. The apparatus of claim 5 wherein said support ring is rectangular in cross section.

7. The apparatus of claim 6 wherein said deflector ring is constructed with a lower face suitable to be brazed to said support ring and has an upper face exposed to drilling fluid flow.

8. The apparatus of claim 7 wherein said deflector is a ring brazed to said support ring.

9. The apparatus of claim 1 wherein said support ring is formed with an upstanding deflector shoulder about said ring.

10. The apparatus of claim 1 wherein said circular support ring is formed of sintered carbide, tungsten, tantalum, titanium, niobium, tungsten molybdenum or alloys thereof.

11. The apparatus of claim 1 wherein said circular support ring supports a plurality of PCD discs thereon at conforming recesses for said discs.

12. The apparatus of claim 1 wherein said circular support ring supports a plurality of PCD discs and said discs are immediately adjacent to an upstanding deflector integrally formed with said circular support ring.

13. The apparatus of claim 1 wherein said deflector ring is, in cross section, non rectangular and defines a sloping exposed face.

14. The apparatus of claim 1 wherein said deflector ring is integral with said circular support ring.

15. The apparatus of claim 1 wherein said deflector ring has a nether circular face joined to the exposed upper face of said circular support ring, and said deflector ring extends fully about said support ring adjacent to said PCD discs.

16. The apparatus of claim 15 wherein said deflector ring is constructed with a circumferential surface equal to a surface of said circular support ring.

17. The apparatus of claim 1 wherein said deflector ring is located on said circular support ring adjacent to and internally spaced from said plurality of similar PCD discs.

18. The apparatus of claim 1 wherein said deflector ring is located on said circular support ring adjacent to and externally spaced from said plurality of similar PCD discs.

19. A mud motor bearing assembly comprising:
   (a) a circular support ring of hard material having an encircling mounting area of a specified width;
   (b) a plurality of similar PCD bearing support surfaces brazed to said ring at said mounting area and extend above said area to a common height to collectively serve as a bearing surface while exposed to drilling fluid; and
   (c) a deflector ring above said mounting area to deflect drilling fluid so that drilling fluid erosion of said bearing support surface is reduced.

20. The assembly of claim 19 wherein said deflector and support rings are integral.

* * * * *